(12) United States Patent
Lopez et al.

(10) Patent No.: US 12,157,575 B2
(45) Date of Patent: Dec. 3, 2024

(54) ACTUATORLESS MOVABLE SEAT ARMREST

(71) Applicant: Safran Seats, Plaisir (FR)

(72) Inventors: Bruno Lopez, Moissy-cramayel (FR); Mouna Souissi Zouaoui, Moissy-Cramayel (FR)

(73) Assignee: Safran Seats, Plaisir (FR)

( * ) Notice: Subject to any disclaimer, the term of this patent is extended or adjusted under 35 U.S.C. 154(b) by 0 days.

(21) Appl. No.: 18/692,537

(22) PCT Filed: Sep. 16, 2022

(86) PCT No.: PCT/EP2022/075816
§ 371 (c)(1),
(2) Date: Mar. 15, 2024

(87) PCT Pub. No.: WO2023/041729
PCT Pub. Date: Mar. 23, 2023

(65) Prior Publication Data
US 2024/0327004 A1    Oct. 3, 2024

(30) Foreign Application Priority Data
Sep. 20, 2021  (FR) ...................................... 2109843

(51) Int. Cl.
*B64D 11/06*   (2006.01)
(52) U.S. Cl.
CPC ...... *B64D 11/0641* (2014.12); *B64D 11/0644* (2014.12)
(58) Field of Classification Search
CPC ................... B64D 11/0641; B64D 11/0644
See application file for complete search history.

(56) References Cited

U.S. PATENT DOCUMENTS

| | | | |
|---|---|---|---|
| 2003/0080597 A1* | 5/2003 | Beroth | B64D 11/0641 |
| | | | 297/423.26 |
| 2009/0302158 A1 | 12/2009 | Darbyshire et al. | |

(Continued)

FOREIGN PATENT DOCUMENTS

| | | | | |
|---|---|---|---|---|
| CN | 111976995 A | * | 11/2020 | ........... B64D 11/064 |
| EP | 2619092 A1 | | 7/2013 | |

OTHER PUBLICATIONS

International Patent Application No. PCT/EP2022/075816, International Search Report and Written Opinion (including machine English translations of each), dated Nov. 4, 2022.

*Primary Examiner* — Anthony D Barfield
(74) *Attorney, Agent, or Firm* — Kilpatrick Townsend & Stockton LLP

(57) ABSTRACT

A seat that can be converted between an upright position and a bed position, includes a mechanism for deploying an armrest, The mechanism includes a first guide connection comprising a first roller mechanically connected to the moving part associated with the seat-cushion portion, the first roller collaborating with a first slot formed in the armrest, and a second guide connection comprising a second roller mechanically connected to a fixed part, the second roller collaborating with a second slot formed in the armrest, such that a movement of the seat-cushion portion of the seat as the seat transitions from the upright position to the bed position causes the armrest to move from the up position to the down position.

9 Claims, 7 Drawing Sheets

(56) References Cited

U.S. PATENT DOCUMENTS

| | | |
|---|---|---|
| 2010/0201172 A1 | 8/2010 | Hudswell et al. |
| 2012/0074751 A1* | 3/2012 | De La Garza ..... B64D 11/0641 297/354.13 |

* cited by examiner

[Fig. 1]
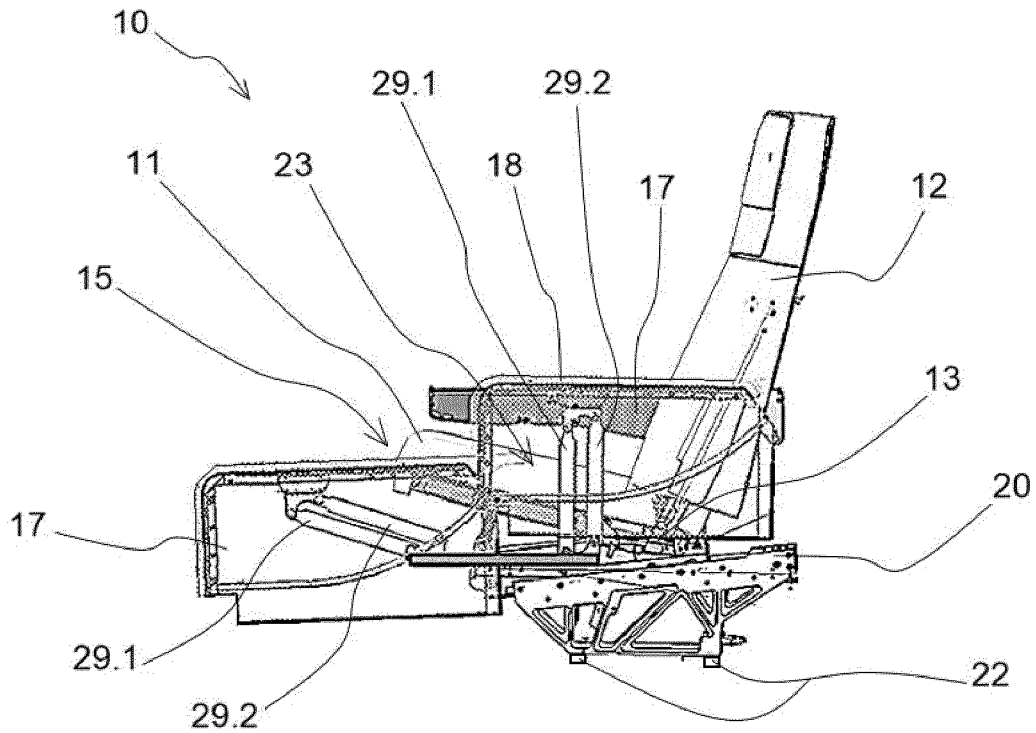
[Fig. 2a]
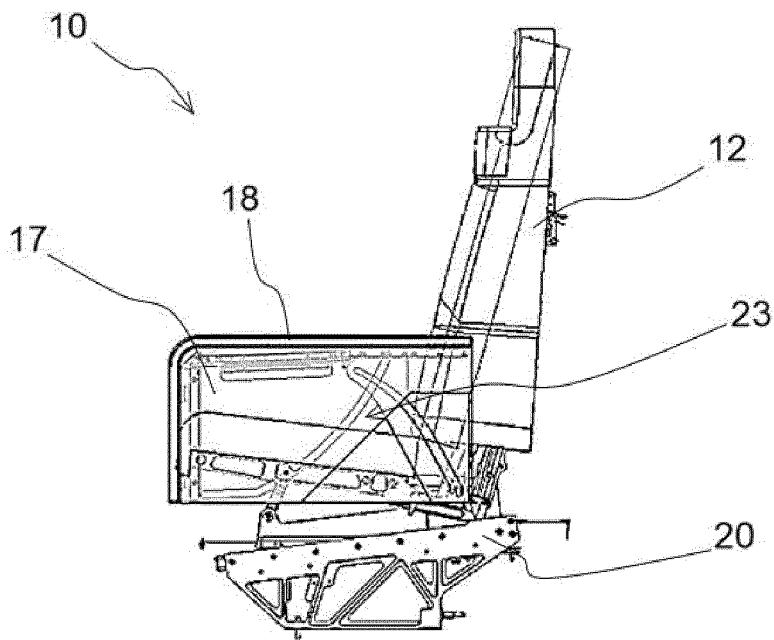

[Fig. 2b]
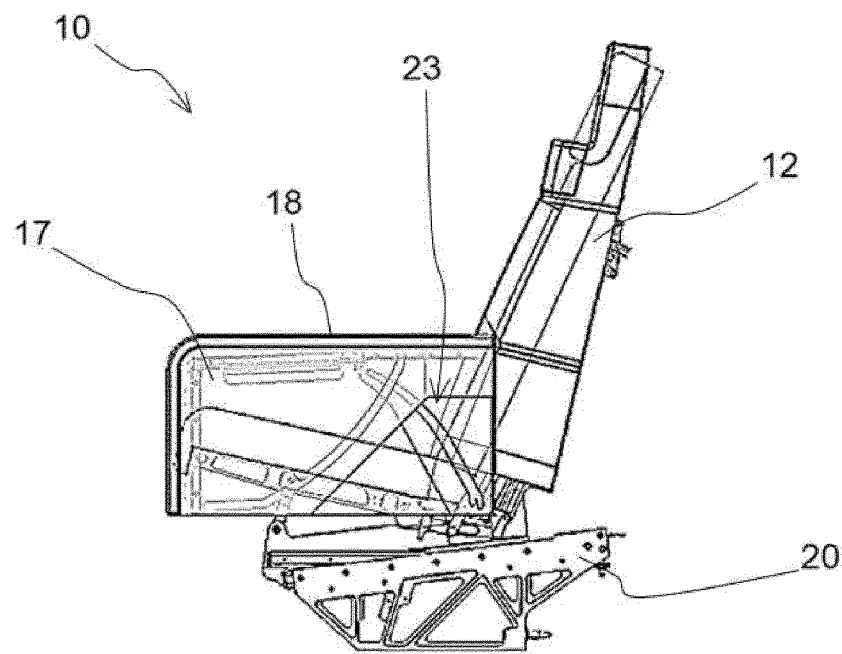
[Fig. 2c]
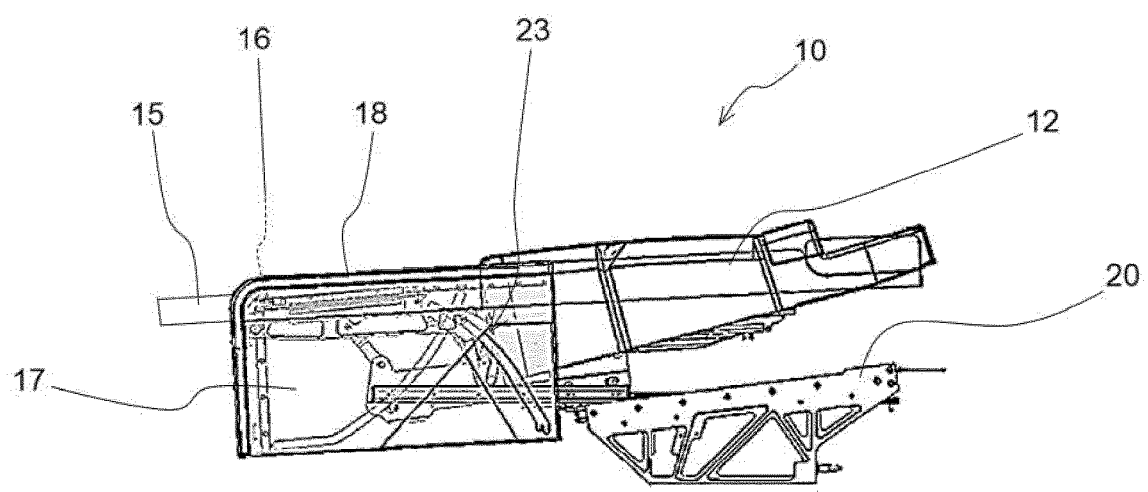

[Fig. 3]
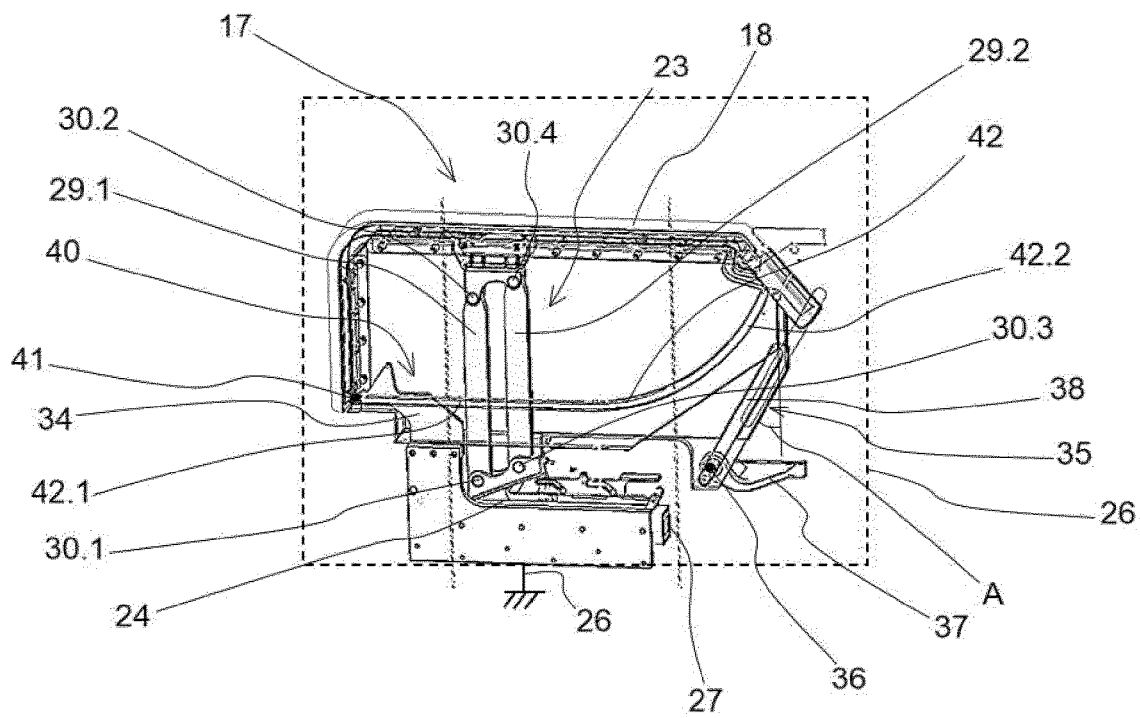
[Fig. 4]
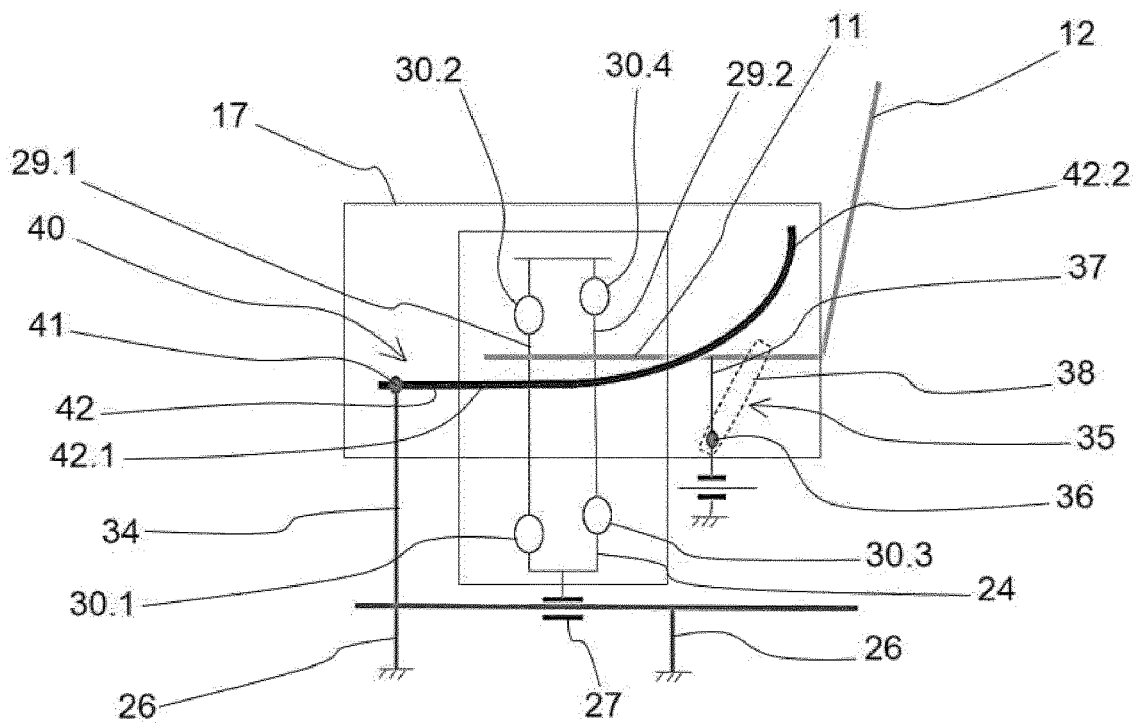

[Fig. 5]
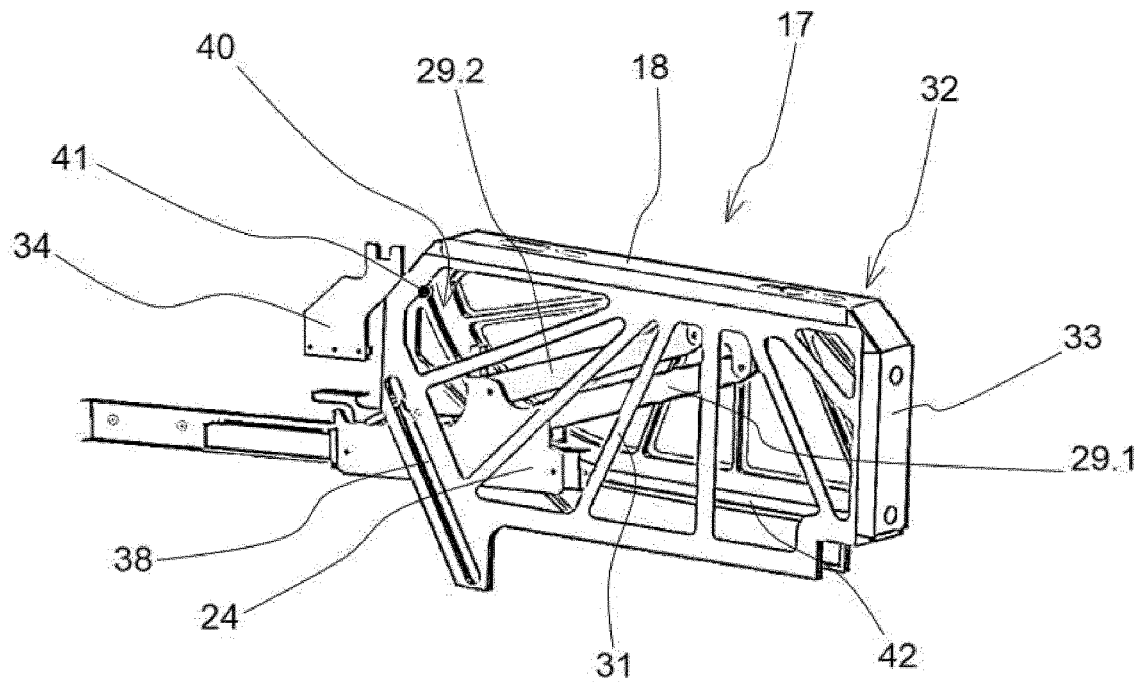
[Fig. 6]
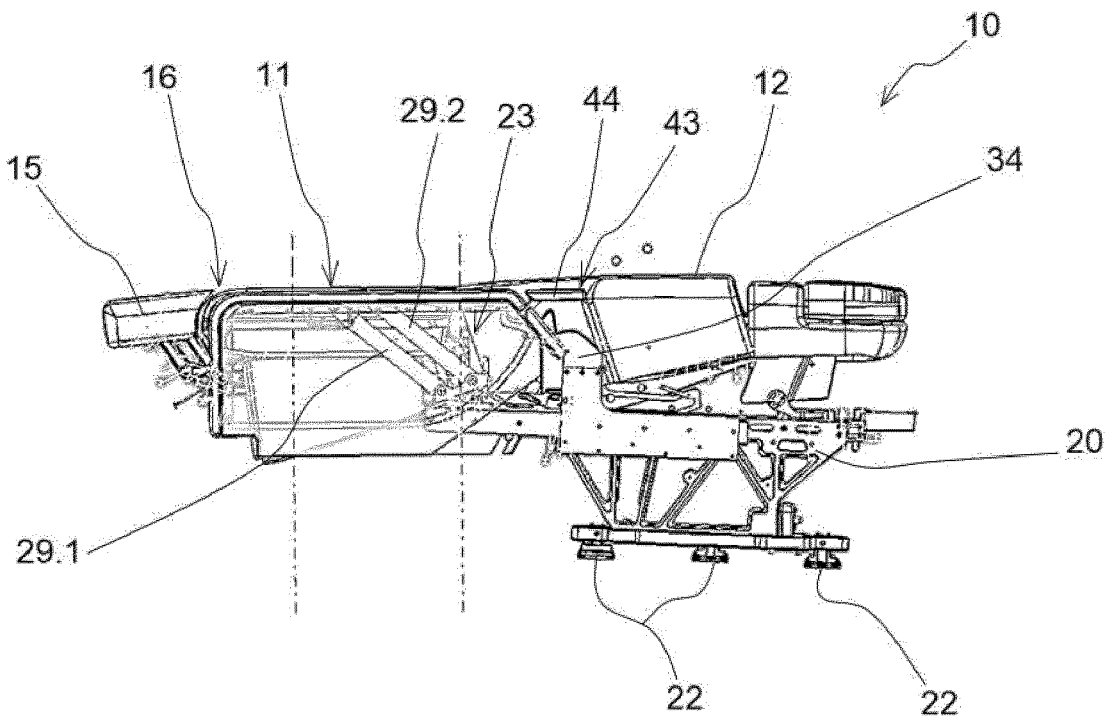

[Fig. 7]
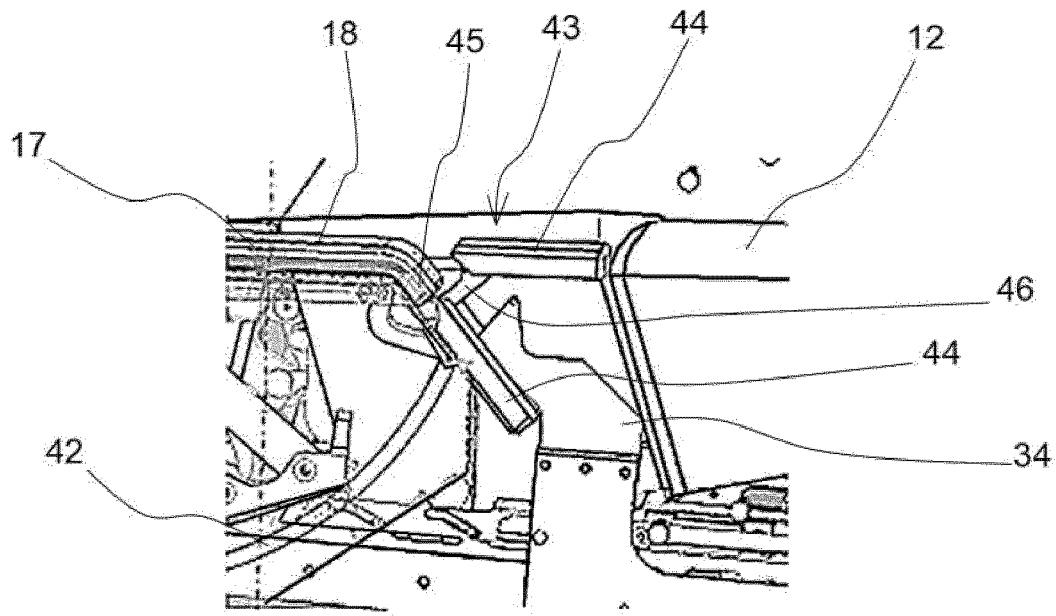
[Fig. 8a]
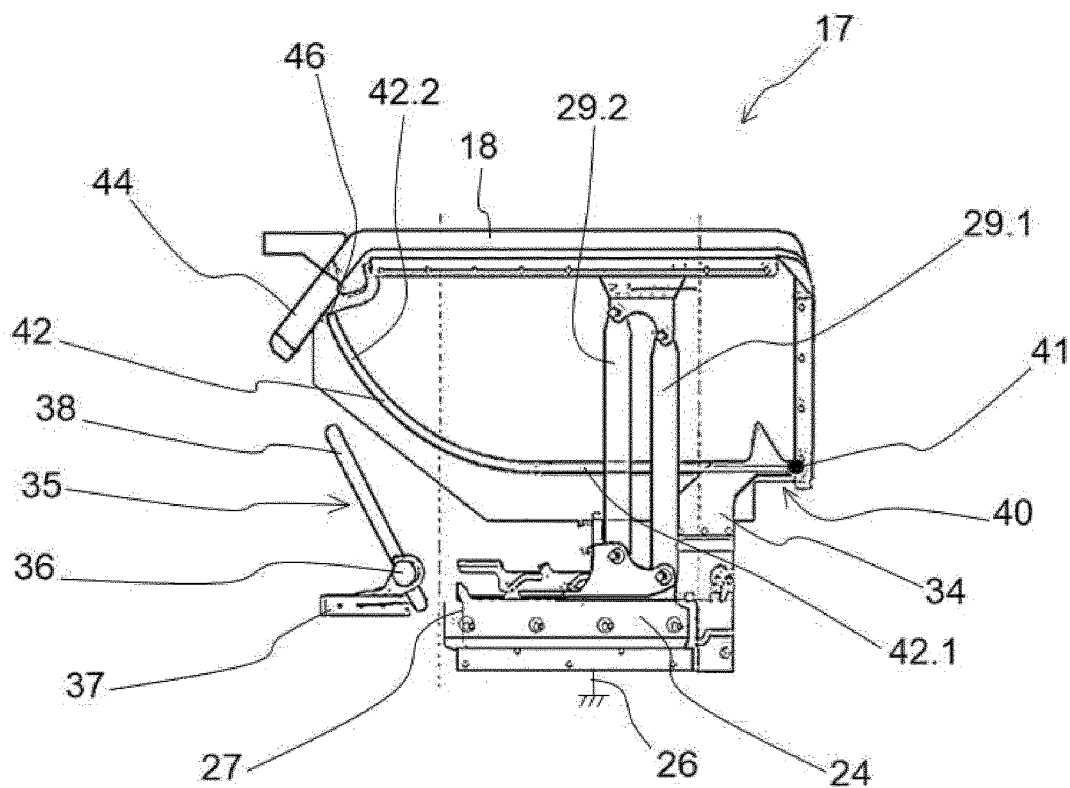

[Fig. 8b]
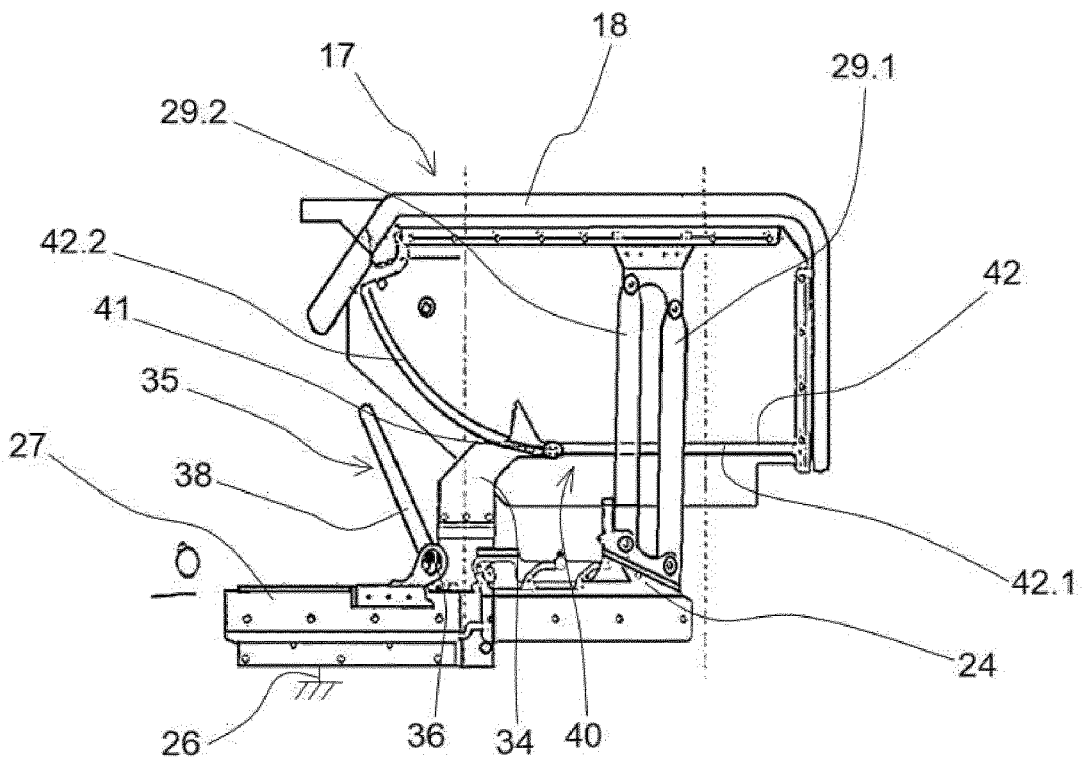
[Fig. 8c]
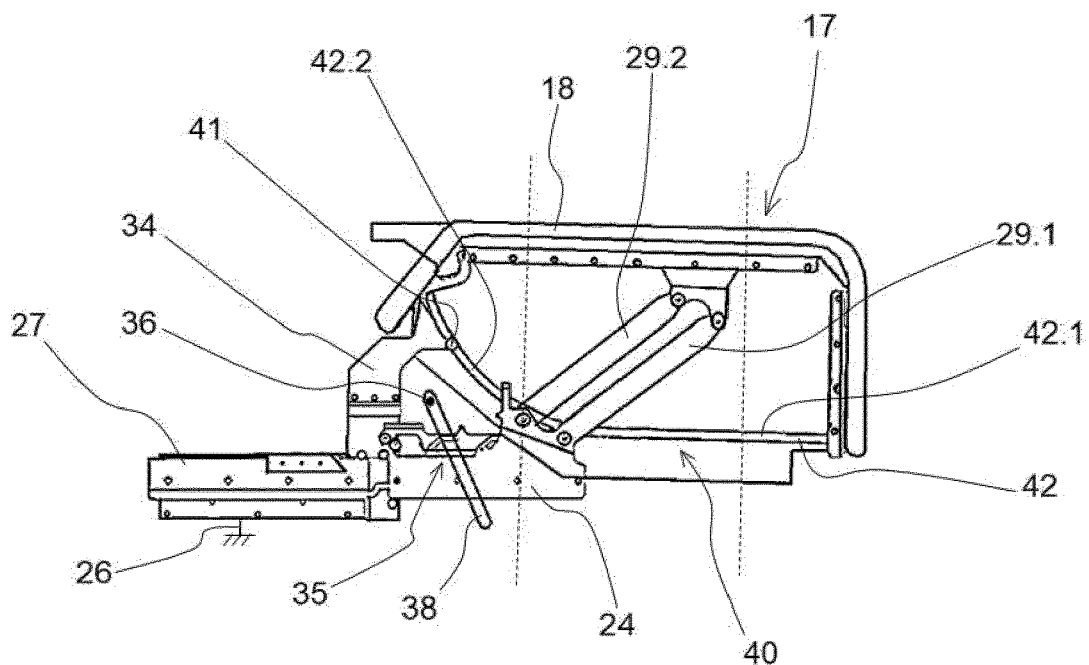

[Fig. 9]
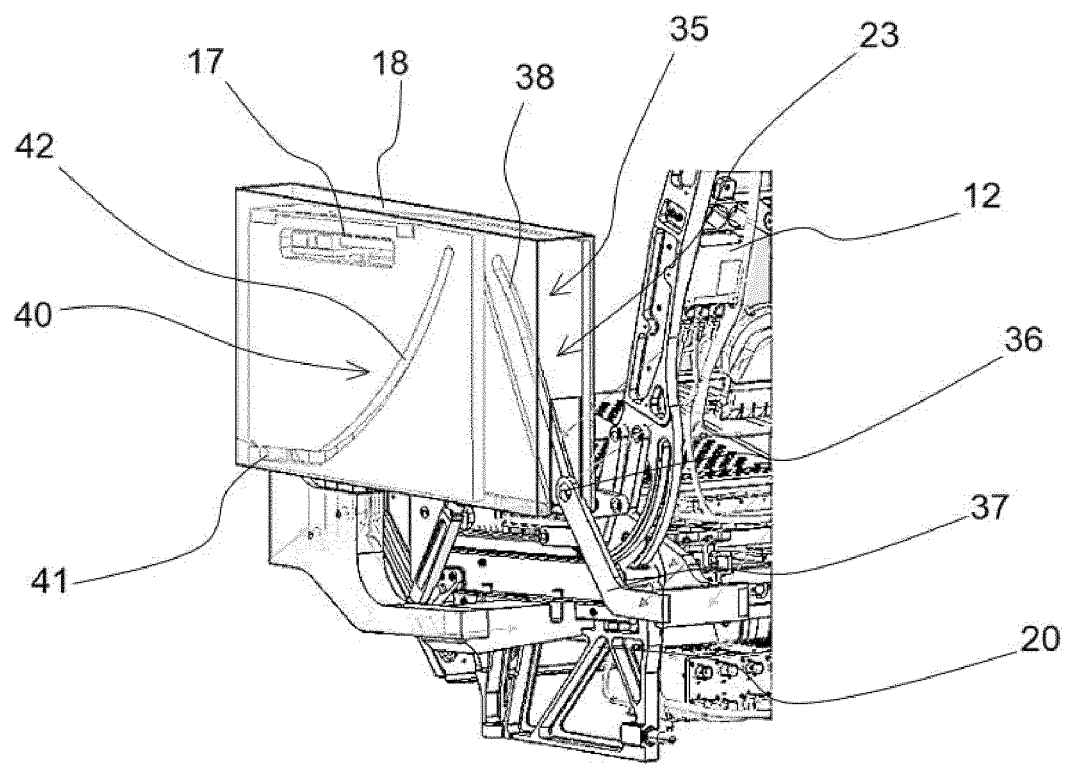

ACTUATORLESS MOVABLE SEAT ARMREST

The present invention relates to an actuatorless movable seat armrest. The invention finds a particularly advantageous, but not exclusive, application with airplane seats, in particular business class type airplane seats.

In a manner known per se, a business class type seat comprises a seat and a backrest articulated relative to the seat via a pivot connection. If necessary, the seat may include a leg rest articulated relative to the seat via a pivot connection. The seat and backrest are mounted on a seat support to be fixed to the floor of an aircraft via fixing rails.

The seat is advantageously provided with a kinematics enabling it to be movable between a raised position and a bed position. In the raised position, each of the backrest and the legrest forms a non-zero angle relative to the seat. The raised position is a position adapted to a take-off, landing, or parking phase of the aircraft. In bed position the backrest and the leg rest are located in an extension of the seat so as to form a substantially horizontal sleeping surface for the passenger.

Document EP2619092 teaches the production of an armrest mechanically connected to the seat via a deployment mechanism making it possible to move the armrest from a high position to a low position. In the high position, an upper face of the armrest is located at a higher level relative to the seat when the seat is in the raised position. In the low position an upper face of the armrest is located substantially at the same level as the seat when the seat is in the bed position.

The problem with such a configuration is that the movement of the armrest is controlled by a movement of the backrest. However, if the backrest kinematics are modified from one seat model to another, it is not possible to guarantee an appropriate movement of the armrest according to the position of the seat.

The objective of the invention is in particular to effectively remedy this aforementioned drawback by proposing a seat that is convertible between a raised position and a bed position, comprising:
- a seating surface and a backrest,
- a kinematics for moving the seat from a raised position to a bed position and vice versa, said kinematics for moving the seat comprising at least one moving part mechanically linked to the seating surface,
- a armrest movable between a high position and a low position, and
- an armrest deployment mechanism allowing the armrest to automatically move from the high position to the low position when the seat moves from the raised position to the bed position and vice versa,
- said armrest deployment mechanism comprising:
- a first guide connection comprising a first roller mechanically linked to the movable part associated with the seating surface, said first roller cooperating with a first groove in the armrest, and
- a second guide connection comprising a second roller mechanically linked to a fixed part, said second roller cooperating with a second groove in the armrest, so that a movement of the seating surface of the seat during a passage of the seat from the raised position to the bed position controls a movement of the armrest from the high position to the low position.

The invention thus makes it possible, thanks to the control of the armrest by a movement of the seating surface, to guarantee a synchronized movement of the armrest relative to the seating surface when the seat moves from a raised position to a bed position. The invention can thus be integrated into a seat independently of the configuration of the backrest thereof which may vary from one type of seat to another. In addition, as the movement of the armrest is controlled by a movement of the seating surface, the invention makes it possible to do without an actuator for moving the armrest from one position to another.

According to one embodiment of the invention, said seat further comprises a carriage mounted so as to be movable in translation relative to the fixed part, and at least one tilting link, in particular two tilting links, each having a first end linked in rotation with said carriage and a second end linked in rotation with an upper part of the armrest.

According to one embodiment of the invention, the tilting link(s) is/are at least partly located inside the armrest.

According to one embodiment of the invention, the second guide groove has a rectilinear portion and a curved portion, said rectilinear portion enabling the armrest to move only in horizontal translation over a predetermined distance before changing level.

According to one embodiment of the invention, the predetermined distance is between 40% and 60% of a total travel of the armrest between the high position and the low position.

According to one embodiment of the invention, the fixed part is formed by a privacy shell or a console associated with said seat.

According to one embodiment of the invention, said seat comprises an arm support pad for filling a space between said armrest and the backrest when the armrest is in the low position.

According to one embodiment of the invention, a part linked to the seating surface is able to move the arm support pad upwards when the seat is moved from the raised position to the bed position.

According to one embodiment of the invention, an upper face of the armrest forms an angle of about a few degrees with a horizontal plane when the armrest is in the low position. This angle of inclination is due to the flight conditions under which the aircraft is inclined relative to the horizontal by an angle of about 3 degrees.

The invention also relates to a vehicle cabin comprising a seat as previously defined.

The present invention will be better understood and other characteristics and advantages will become apparent on reading the following detailed description comprising embodiments given by way of illustration with reference to the appended figures, presented by way of non-limiting examples, which may be used to complete the understanding of the present invention and the presentation of its realization and, if necessary, contribute to its definition, wherein:

FIG. 1 is a side view of an airplane seat provided with an armrest according to the present invention shown in transparency respectively in a high position and in a low position;

FIGS. 2a, 2b, and 2c are side views of an airplane seat provided with an armrest according to the present invention respectively when the seat is in a raised position, a relaxed position, and a bed position;

FIG. 3 is a detailed side view of a seat armrest according to the present invention;

FIG. 4 is a schematic representation of the different mechanical connections between the armrest and the seat according to the invention;

FIG. 5 is a perspective view illustrating the positioning of the tilting links inside a hollow body of the armrest according to the invention;

FIG. 6 is a side view of a seat according to the invention in the bed position illustrating the presence of an arm support pad making it possible to fill a space between the armrest and part of the seat backrest when the armrest is in low position;

FIG. 7 is a detailed side view of the arm support pad making it possible to fill a space between the armrest and part of the seat backrest when the armrest is in the low position;

FIGS. 8a, 8b, and 8c illustrate a movement of the armrest according to the invention between a high position and a low position;

FIG. 9 is a perspective view of a variant embodiment of the armrest according to the present invention fixed to a fixed part formed by the seat support.

Identical, similar, or analogous elements have the same reference from one figure to another.

In the remainder of the description, the relative terms of the "horizontal", "vertical", "high", "low" type are understood by reference to the common sense that a person in a seat according to the invention would give them in an airplane cabin.

FIG. 1 shows a seat 10 in particular for an airplane cabin comprising a seating surface 11, a backrest 12 articulated relative to the seating surface 11 via a pivot connection 13 with a horizontal axis. If necessary, the seat 10 may include a leg rest 15 articulated relative to the seating surface 11 via a pivot connection 16 with a horizontal axis. The seat 10 also includes at least one armrest 17 having an upper wall 18 on which a passenger can rest part of her/his body, in particular her/his arm.

The seat 10 also includes a seat support 20 to be fixed on the rails of an aircraft cabin. For this purpose, the seat support 20 comprises feet provided with locks 22 capable of securing the seat support 20 with the rails of the aircraft cabin.

The seat 10 is advantageously provided with a kinematics enabling it to be movable between a raised position and a bed position. The kinematics comprise a set of actuators, connecting parts, and joints making it possible to ensure the relative movement of the different components of the seat 10 when moving from one position to another.

In the raised position visible in FIG. 2a, the backrest 12 forms a non-zero angle relative to the seating surface 11. The raised position is a position adapted to a take-off, landing or parking phase of the 'plane. In the bed position visible in FIG. 2c, the backrest 12 and the leg rest 15 are located in an extension of the seating surface 11 so as to form a sleeping surface for the passenger which is substantially horizontal. When moving from the raised position to the bed position, the seating surface 11 moves in translation towards the front of the seat 10 while the backrest 12 moves in rotation relative to the seating surface 11 towards the rear of the seat 10. The seat 10 can also take intermediate comfort positions in which the backrest 12 is strongly inclined towards the rear, such as the position shown in FIG. 2b.

Furthermore, as can be seen in FIGS. 1 and 3, a deployment mechanism 23 of the armrest 17 makes it possible to automatically move the armrest 17 from a high position to a low position when the seat 10 moves from the raised position to the bed position, and vice versa. By "automatically" it is meant that the armrest 17 can move from one position to another without action from the passenger when the seat 10 moves from one position to another.

In the high position visible in FIG. 2a, the upper wall 18 of the armrest 17 is located above the seating surface 11 when the seat 10 is in the raised position. In the low position visible in FIGS. 2c and 6, the upper wall 18 of the armrest 17 is located substantially at the same level as an upper face of the seating surface 11 when the seat 10 is in the bed position. The level of the upper wall 18 of the armrest 17 is measured vertically relative to the floor of the aircraft cabin. By "substantially at the same level", it is meant that there can be at most a slight difference in level, in particular less than 5 cm, between the upper wall 18 of the armrest 17 and the upper face of the seating surface 11.

More precisely, as can be seen in FIGS. 3, 4, and 5, the deployment mechanism 23 of the armrest 17 comprises a carriage 24 provided with the armrest 17. This carriage 24 is mobile in translation relative to a fixed part 26. For this purpose, the carriage 24 is able to slide along a slide 27 mounted on the fixed part 26.

The fixed part 26 may be formed by a privacy shell or a console associated with said seat 10. The privacy shell at least partly surrounds the seat 10 so as to create a semi-enclosed space around the seat 10 in order to provide some privacy to the passenger. The console could be conventionally formed by a piece of furniture comprising an upper surface forming a table as well as storage space for the passenger comprising one or more elements from a literature pocket, a bottle holder, or a minibar. The choice of storage spaces is configurable according to the wishes of the airline.

At least one tilting link 29.1, 29.2 is mounted between the carriage 24 and the armrest 17. In the example shown, two tilting links 29.1, 29.2 are provided, each having a first end linked in rotation with the carriage 24 and a second end linked in rotation with an upper part of the armrest 17, as shown in FIGS. 3 and 4.

The link 29.1 is thus connected respectively with the carriage 24 via a pivot connection 30.1 and with the upper part of the armrest 17 via a pivot connection 30.2. The link 29.2 is connected respectively with the carriage 24 via a pivot connection 30.3 and with the upper part of the armrest 17 via a pivot connection 30.4.

The tilting links 29.1, 29.2 make it possible to SO as to meet mechanically reinforce the armrest 17 constraints imposed by certification tests according to which overloads, in particular of about 1000N to 1500N are applied vertically and horizontally on the armrest 17. The integration of the tilting links 29.1, 29.2 makes it possible to pass the certification tests whatever the position of the armrest 17.

As can be seen in FIG. 5, the tilting links 29.1, 29.2 are housed at least partly inside a hollow body of the armrest 17. More precisely, the body of the armrest 17 comprises the upper wall 18, two side walls 31, 32, as well as at least one end wall 33. The armrest 17 thus has a U-shaped section delimiting a hollow space in which the tilting links 29.1, 29.2 are located. The walls of the armrest 17, in particular the side walls 31, 32, may be perforated in order to reduce the weight of the armrest 17. The armrest may be made of a metallic material, such as steel, aluminum, or magnesium, or a rigid plastic material, or a fiber-filled composite material, or any other material suitable for the application.

Furthermore, a first guide connection 35 comprises a first roller 36 fixed to a movable part 37. The first roller 36 cooperates with a first guide groove 38 in the armrest 17. The movable part 37 is mechanically linked to the seating surface 11 which moves in translation when the position of the seat 10 changes.

The first guide groove 38 is made in the side wall 31 of the armrest 17, as shown in FIG. 5. The first guide groove 38 has a rectilinear shape. The first guide groove 38 is inclined relative to a vertical direction. The first guide groove 38 can thus form an angle A between 10 and 45 degrees relative to a vertical direction, as shown in FIG. 3.

A second guide connection 40 comprises a second roller 41 mechanically linked to the fixed part 26. The second roller 41 cooperates with a second guide groove 42 in the armrest 17. In this case, the second roller 41 is carried by a support part 34 fixed on the fixed part 26 (privacy shell or console). The support part 34 may generally have an L shape.

The second guide groove 42 is made in the side wall 32 opposite the side wall 31. The second guide groove 42 has a rectilinear portion 42.1 and a curved portion 42.2. The rectilinear portion 42.1 allows the armrest 17 to move only in horizontal translation over a predetermined distance before changing level. By "changing level", it is meant a modification of the position of the armrest 17 along the vertical axis. The predetermined distance is preferably between 40% and 60% of a total travel of the armrest 17 between the high position and the low position. This ensures that the armrest 17 only moves in translation with the seating surface 11 when the seat 10 takes intermediate positions between the raised position and the bed position.

The curved portion 42.2 allows the armrest 17, at the end of its translational movement, to change level so as to move to the low position when the seat 10 moves towards the bed position. The shape of the second guide groove 42 corresponds to the trajectory of the armrest 17 during the movement thereof from the high position to the low position or vice versa.

The configuration of the seat 10 is such that a movement of the seating surface 11 when the seat 10 moves from the raised position to the bed position controls a movement of the armrest 17 from the high position to the low position. Conversely, a movement of the seating surface 11 of the seat 10 from the bed position to the raised position controls a movement of the armrest 17 from the low position to the high position. As the movement of the armrest 17 is controlled by a movement of the seating surface 11, the invention makes it possible to do without an actuator for moving the armrest 17 from one position to another.

Advantageously, as can be seen in FIGS. 6 and 7, the seat 10 includes an arm support pad 44 for filling a space 43 between the armrest 17 and part of the backrest 12 when the armrest 17 is in the low position. The arm support pad 44 is mechanically connected to the rear part of the armrest 17 via a pivot connection 45. A part 46 linked to the seating surface 11 is able to raise the arm support pad 44 when the seat 10 moves from the raised position to the bed position. The movement of the arm support pad 44 is such that the latter extends horizontally so as to fill the space 43 between the armrest 17 and part of the backrest 12 when the armrest 17 is in the low position. The arm support pad 44 falls under its own weight when the armrest 17 moves from the low position to the high position.

It is described below, with reference to FIGS. 8a to 8c, the operation of the armrest 17 when the seat 10 moves from the raised position to the bed position.

When the passenger orders a change in position of the seat 10 from the raised position to the bed position, the moving part 37 linked to the seating surface 11 moves in forward translation.

The movable part 37 then drives the carriage 24 and the armrest 17 in forward translation via the first roller 36. The armrest 17 moves via the second roller 41 following the rectilinear portion 42.1 of the second guide groove 42. When moving the armrest 17 along the rectilinear portion 42.1, the seat 10 can take different intermediate positions. During its movement in translation, the armrest 17 is maintained at the same level as when the seat 10 is in the raised position.

Once the armrest 17 has traveled the rectilinear portion 42.1, the armrest 17 slides along the curved portion 42.2 of the second guide groove 42. The armrest 17 descends down to the floor so as to move to the low position so that the upper wall 18 is located substantially at the same level as the seating surface 11 when the seat 10 is in the bed position. In order to allow the armrest 17 to move downwards, the first roller 36 rises along the first guide groove 38. The links 29.1.29.2 then pivot around their respective pivot connections 30.1-30.4 so as to accompany the descent of the armrest 17 down to the low position.

When the armrest 17 is in the low position, an upper face of the armrest 17 advantageously forms an angle of about a few degrees relative to a horizontal plane parallel to the floor of the aircraft cabin. This angle corresponds to the angle formed by the bed surface of the seat 10 so as to compensate for an angle of inclination of the aircraft in flight. This angle is for example between 2 and 5 degrees and is preferably of about 3 degrees.

Concomitantly with the movement of the armrest 17 towards its low position, the arm support pad 44 initially pressed against a wall of the armrest 17 is driven by the part 46 so that it straightens out in order to extend in a horizontal plane and fill the space 43 between the armrest 17 and part of the backrest 12.

When the seat 10 moves from the bed position to the raised position, the armrest 17 will make a reverse movement so as to return to the high position.

The configuration of the armrest 17 described above makes it easier to pass certification tests. Indeed, the integration of the armrest 17 directly on the structure of the seat 10 would generate additional mechanical stresses on the seat 10 during the application of forces representative of a shock on the seat 10. Conversely, supporting the armrest 17 by means of a fixed part 26 annexed to the seat 10 (privacy shell or console) makes it possible to reduce the mechanical stresses undergone by the seat 10 during the certification test.

It is however possible to mount the armrest 17 on the seat support 20 which forms then the fixed part 26, as illustrated in FIG. 9.

According to a degraded configuration less resistant to overloads applied to the armrest 17, it is also possible to eliminate the presence of the tilting links 29.1, 29.2 and the carriage 24. The deployment mechanism 23 of the armrest 17 then comprises only the first guide connection 35 and the second guide connection 40 enabling the armrest 17 to be guided between the high position and the low position, as shown in FIG. 9.

Of course, the different characteristics, variants and/or embodiments of the present invention can be associated with each other in various combinations to the extent that they are not incompatible with each other or exclusive from one another.

Furthermore, the invention is not limited to the embodiments described above and provided solely by way of example. It encompasses various modifications, alternative forms and other variants that those skilled in the art may consider in the context of the present invention and in particular all combinations of the different modes of operation described above, which can be taken separately or in combination.

Although the invention has been described for a seat installed in an airplane cabin, the invention could also be implemented in another transport vehicle such as a train, a bus, a boat, or any other aircraft such as a helicopter.

The invention claimed is:

1. A seat convertible between a raised position and a bed position comprising:
   a seating surface and a backrest,
   a kinematics for moving the seat in order to move the seat from a raised position to a bed position and vice versa, said kinematics for moving the seat comprising at least one moving part mechanically linked at the seating surface,
   an armrest movable between a high position and a low position, and
   a deployment mechanism for the armrest making it possible to automatically move the armrest from the high position to the low position when the seat moves from the raised position to the bed position, and vice versa,
   wherein said deployment mechanism for the armrest comprises:
      a first guide connection comprising a first roller mechanically linked to the at least one moving part associated with the seating surface, said first roller cooperating with a first groove in the armrest, and
      a second guide connection comprising a second roller mechanically linked to a fixed part, said second roller cooperating with a second groove in the armrest, so that a movement of the seating surface of the seat when the seat moves from the raised position to the bed position controls a movement of the armrest from the high position to the low position and
      a carriage mounted so as to be movable in translation relative to the fixed part, and at least one tilting link having a first end linked in rotation with said carriage and a second end linked in rotation with an upper part of the armrest.

2. The seat according to claim 1, wherein the tilting link(s) is/are at least partly located inside the armrest.

3. The seat according to claim 1, wherein the second groove has a rectilinear portion and a curved portion, said rectilinear portion enabling the armrest to move only in horizontal translation over a predetermined distance before changing level.

4. The seat according to claim 3, wherein the predetermined distance is between 40% and 60% of a total travel of the armrest between the high position and the low position.

5. The seat according to claim 1, wherein the fixed part is formed by a privacy shell or a console associated with said seat.

6. The seat according to claim 1, wherein it comprises an arm support pad for filling a space between said armrest and the backrest when the armrest is in the low position.

7. The seat according to claim 6, wherein a part linked to the seating surface is capable of raising the arm support pad upwards when the seat moves from the raised position to the bed position.

8. The seat according to claim 1, wherein an upper face of the armrest forms an angle of about a few degrees with a horizontal plane when the armrest is in the low position.

9. A vehicle cabin comprising a seat as defined according to claim 1.

* * * * *